(12) United States Patent
Schubert

(10) Patent No.: US 8,246,312 B2
(45) Date of Patent: Aug. 21, 2012

(54) HUB ASSEMBLY FOR USE WITH A WIND TURBINE AND METHOD OF MAKING THE SAME

(75) Inventor: Andreas Schubert, Ostercappeln (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/168,307

(22) Filed: Jun. 24, 2011

(65) Prior Publication Data

US 2012/0027602 A1 Feb. 2, 2012

(51) Int. Cl.
*F03D 11/04* (2006.01)
(52) U.S. Cl. .................................. 416/244 R
(58) Field of Classification Search ............. 416/244 R, 416/245 R, 155, 156, 244 A
See application file for complete search history.

(56) References Cited

U.S. PATENT DOCUMENTS

| | | | |
|---|---|---|---|
| 6,872,049 B2 | 3/2005 | Christensen | |
| 7,011,497 B2 | 3/2006 | Schmidt | |
| 7,470,111 B2 * | 12/2008 | Schubert | 416/155 |
| 7,614,850 B2 | 11/2009 | Rogall | |
| RE41,326 E | 5/2010 | Delucis et al. | |
| 7,874,800 B2 * | 1/2011 | Kirchner et al. | 416/155 |
| 2011/0250077 A1 * | 10/2011 | Pedersen | 416/244 R |

FOREIGN PATENT DOCUMENTS

| | | | |
|---|---|---|---|
| DE | 202004003521 U1 * | 7/2004 | |
| EP | 1933027 A1 * | 6/2008 | |
| WO | WO 03064854 A1 * | 8/2003 | |

* cited by examiner

*Primary Examiner* — Richard Edgar
(74) *Attorney, Agent, or Firm* — James McGinness; Armstrong Teasdale LLP

(57) ABSTRACT

A hub assembly for use with a wind turbine is provided. The hub assembly includes a body formed from a first material, a bearing seat formed integrally with the body, and a support assembly positioned within an opening defined by the bearing seat and at least partially coupled to the body. The support assembly includes an insert formed from a second material different than the first material.

20 Claims, 11 Drawing Sheets

HUB ASSEMBLY FOR USE WITH A WIND TURBINE AND METHOD OF MAKING THE SAME

BACKGROUND OF THE INVENTION

The embodiments described herein relate generally to a hub assembly and, more particularly, to a hub assembly for use with a wind turbine.

Some known wind turbines include a hub that couples blades to a rotor. In at least some known wind turbines, the hub is one of the heaviest components of the wind turbine. More specifically, the hub is subjected to relatively high forces as the blades interact with wind and the rotor is rotated by the blades. At least one known hub is cast unitarily as one piece from iron. Such a hub includes a solid support structure adjacent each blade coupling region to carry tensile forces applied to the blade coupling region. At least one known solid support structure is formed integrally with the hub from casting iron. Such a support structure has a thickness of between about 50 millimeters (mm) and about 100 mm, depending on a diameter of a pitch bearing and associated bearing seat. Due to the properties of casting iron, the solid support structure is relatively thick to carry the tensile loads.

BRIEF DESCRIPTION OF THE INVENTION

In one aspect, a hub assembly for use with a wind turbine is provided. The hub assembly includes a body formed from a first material, a bearing seat formed integrally with the body, and a support assembly positioned within an opening defined by the bearing seat and at least partially coupled to the body. The support assembly includes an insert formed from a second material different than the first material.

In another aspect, a wind turbine is provided. The wind turbine includes a rotor, a blade, and a hub assembly configured to couple the blade to the rotor. The hub assembly includes a body formed from a first material, a bearing seat formed integrally with the body, and a support assembly positioned within an opening defined by the bearing seat and at least partially coupled to the body. The support assembly includes an insert formed from a second material different than the first material.

In yet another aspect, a method for making a hub assembly is provided. The method includes casting a body including a bearing seat integrally as one piece from a first material, providing an insert formed from a second material different than the first material, and positioning the insert within an opening defined by the bearing seat. The insert is coupled to the body.

BRIEF DESCRIPTION OF THE DRAWINGS

FIG. 1 is a perspective view of an exemplary wind turbine.

FIG. 2 is a perspective view of an exemplary hub assembly that may be used with the wind turbine shown in FIG. 1.

FIG. 3 is a side view of the hub assembly shown in FIG. 2 from the perspective of line 3-3.

FIG. 4 is a cross-sectional view of the hub assembly shown in FIG. 2 taken at line 4-4.

FIG. 5 is a side view of a first alternative hub assembly that may be used with the wind turbine shown in FIG. 1.

FIG. 6 is a cross-section view of the hub assembly shown in FIG. 5.

FIG. 7 is a side view of a second alternative hub assembly that may be used with the wind turbine shown in FIG. 1.

FIG. 8 is a cross-section view of the hub assembly shown in FIG. 7.

FIG. 9 is a side view of a third alternative hub assembly that may be used with the wind turbine shown in FIG. 1.

FIG. 10 is a cross-section view of the hub assembly shown in FIG. 9.

FIG. 11 is a flowchart of a method for making the hub assemblies shown in FIGS. 2-10.

DETAILED DESCRIPTION OF THE INVENTION

The embodiments described herein provide a hub assembly that has a lighter weight than a weight of a known wind turbine hub. More specifically, the herein-described hub assembly includes a support assembly rather than a conventional solid support structure. The support assembly includes an insert having a higher yield strength as compared to a yield strength of a material from which the hub is cast. As such, a thickness of the hub can be reduced, at least in the support assembly, as compared to a thickness of known solid support structures, while being able to carry the tensile loads the hub experiences.

Figure 1:
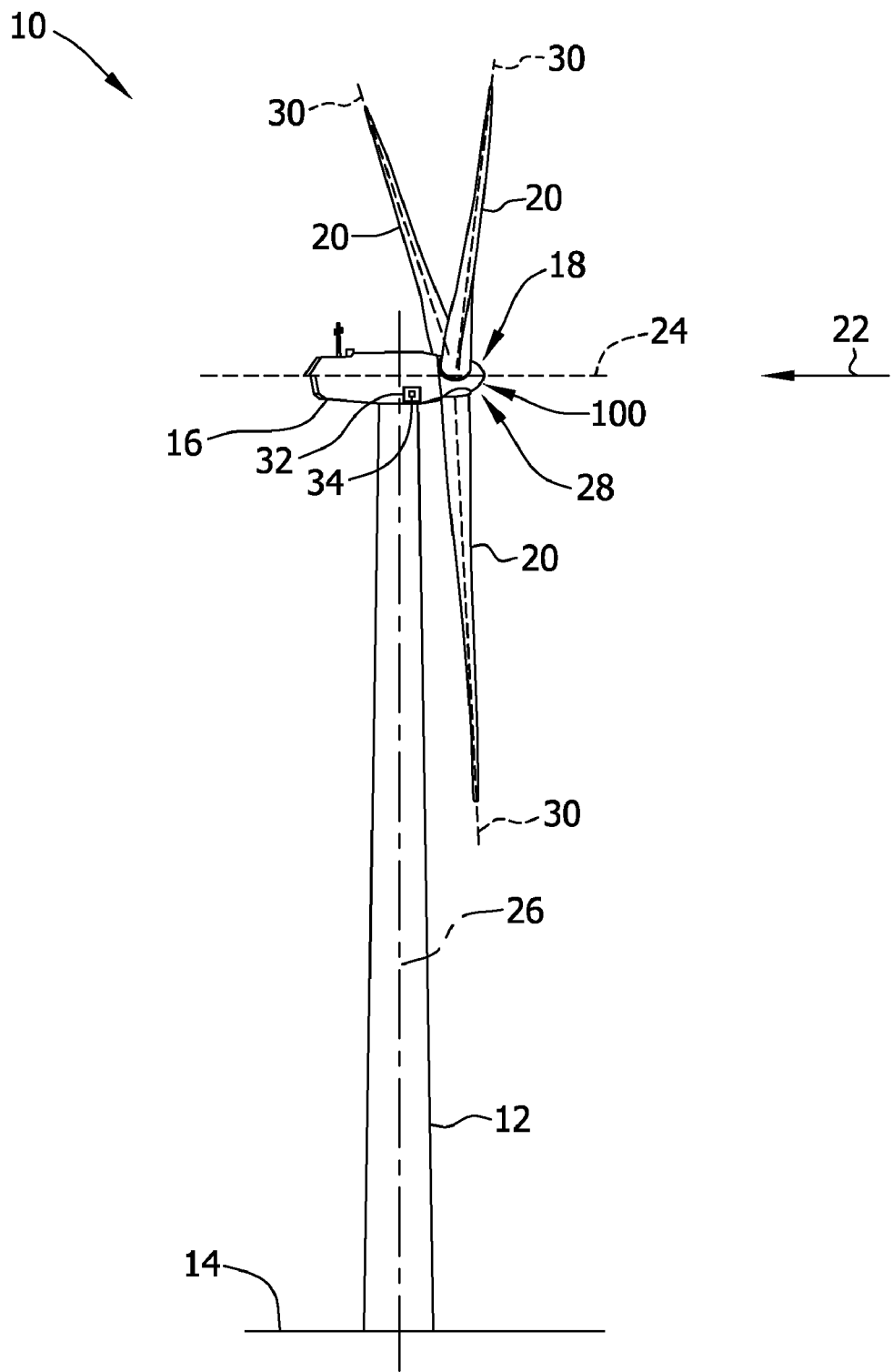
FIGS. 1-11 show exemplary embodiments of the apparatus and methods described herein.

FIG. 1 is a perspective view of an exemplary wind turbine 10. In the exemplary embodiment, wind turbine 10 is a nearly horizontal-axis wind turbine. In another embodiment, wind turbine 10 may have any suitable tilt angle. Alternatively, wind turbine 10 may be a vertical axis wind turbine. In the exemplary embodiment, wind turbine 10 includes a tower 12 that extends from a supporting surface 14, a nacelle 16 mounted on tower 12, and a rotor 18 that is coupled to nacelle 16. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower. A height of tower 12 is selected based upon factors and conditions known in the art.

Rotor 18 further includes a rotatable hub assembly 100 and at least one blade 20 coupled to and extending outward from hub assembly 100. In the exemplary embodiment, rotor 18 has three blades 20. In an alternative embodiment, rotor 18 includes more or less than three blades 20. In the exemplary embodiment, blades 20 are spaced about hub assembly 100 to facilitate rotating rotor 18 to enable kinetic energy to be transferred from the wind into usable mechanical energy, and subsequently, electrical energy. Blades 20 have a length of between approximately 30 meters (m) (99 feet (ft)) and approximately 120 m (394 ft). Alternatively, blades 20 may have any length that enables wind turbine 10 to function as described herein. As wind strikes blades 20 from a direction 22, rotor 18 is rotated about an axis of rotation 24. As blades 20 are rotated and subjected to centrifugal forces, blades 20 are also subjected to various forces and moments.

Further, in the exemplary embodiment, as direction 22 changes, a yaw direction of nacelle 16 may be controlled about a yaw axis 26 to position blades 20 with respect to direction 22. A pitch angle of blades 20, i.e., an angle that determines a perspective of blades 20 with respect to a rotor plane, may be adjusted by a pitch adjustment system 28. Pitch adjustment system 28 is configured to control power, load, and/or noise generated by wind turbine 10 by adjusting an angular position of a profile of at least one blade 20, about a respective pitch axis 30, relative to wind vectors. In the exemplary embodiment, a pitch of each blade 20 is controlled individually by a control system 32. Alternatively, the blade pitch for all blades 20 may be controlled simultaneously by control system 32.

In the exemplary embodiment, control system 32 is shown as being centralized within nacelle 16, however control system 32 may be a distributed system throughout wind turbine 10, on supporting surface 14, within a wind farm, and/or at a remote control center. Control system 32 includes at least one processor 34 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor, and/or a display.

Processors and/or controllers described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control commands and/or pitch adjustment control commands. The execution of sequences of instructions is not limited to any specific combination of hardware circuitry and software instructions.

Figure 2:
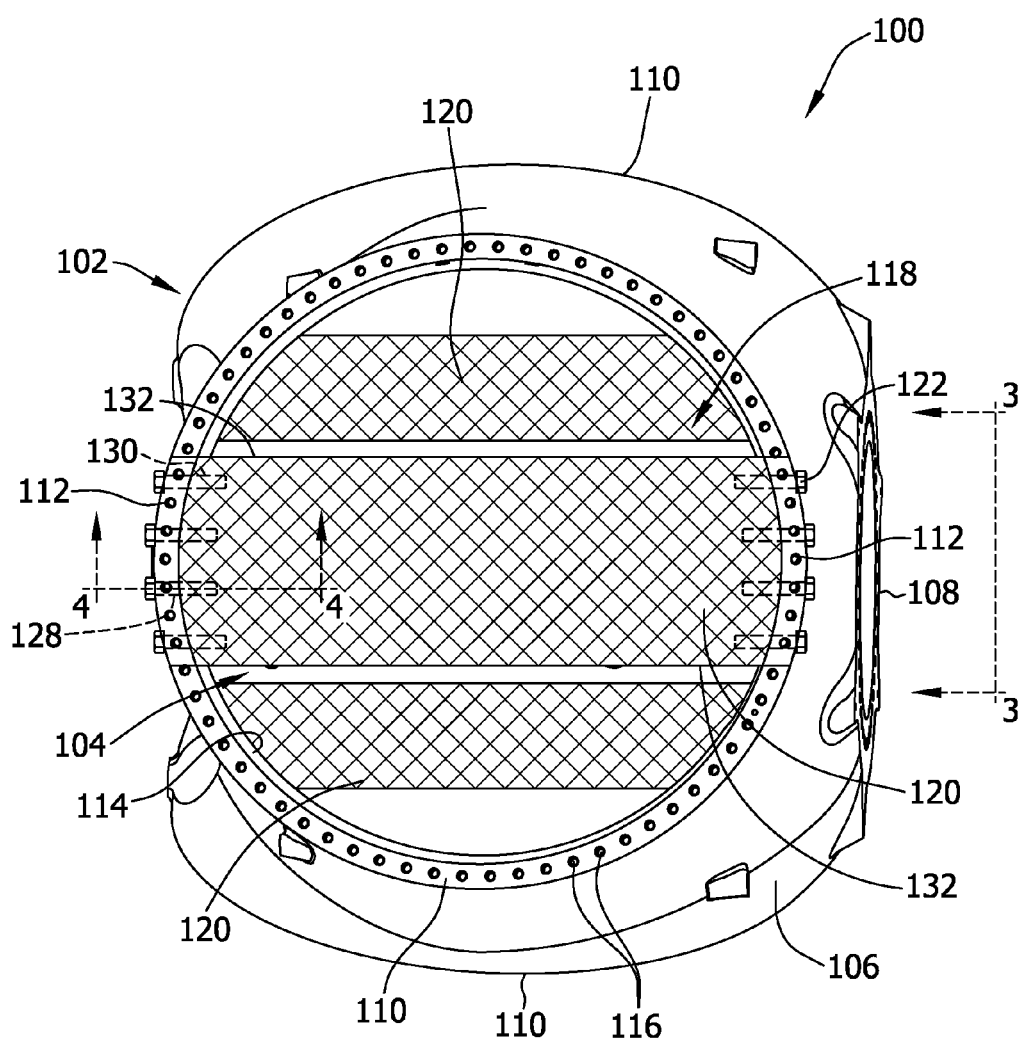
Figure 3:
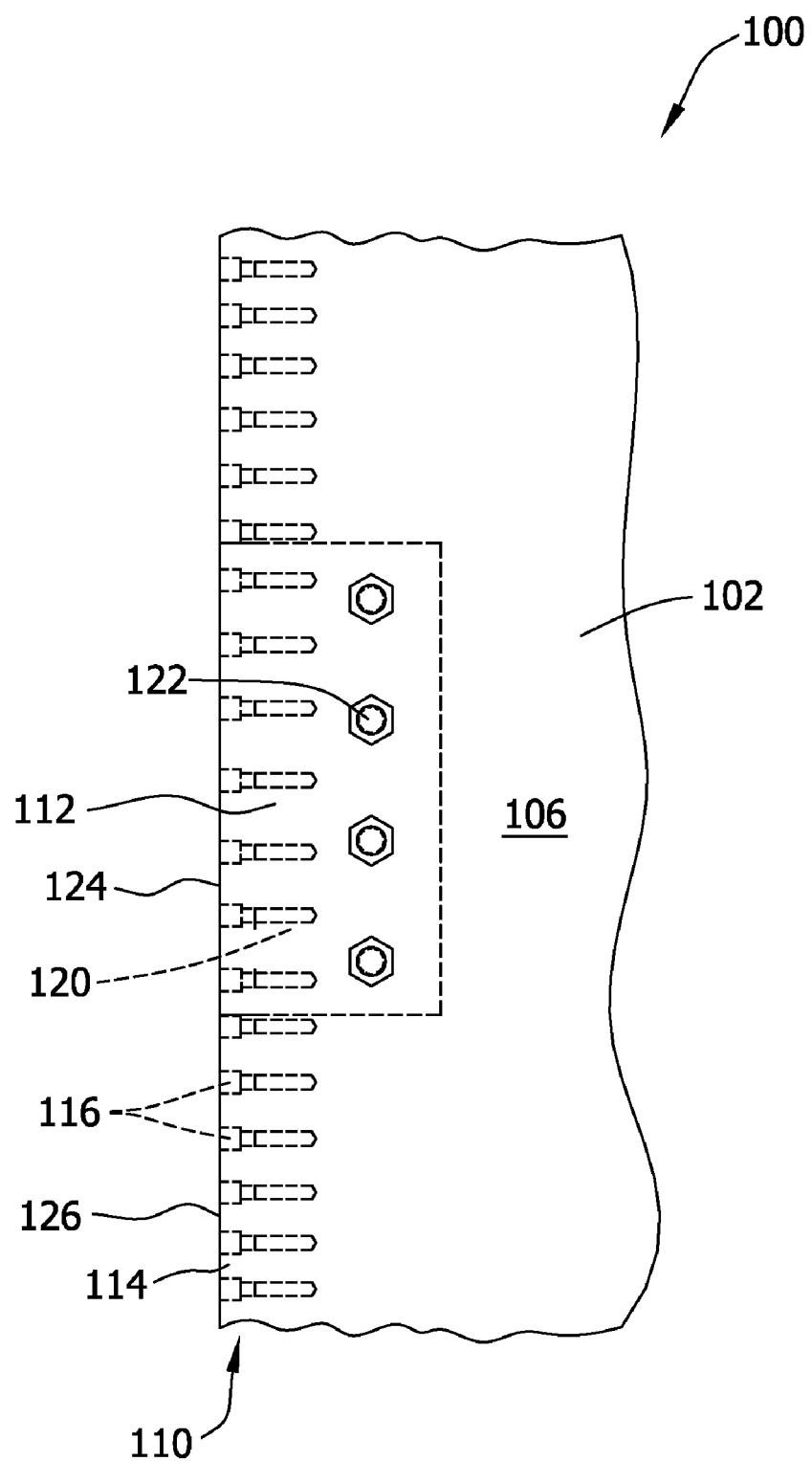
Figure 4:
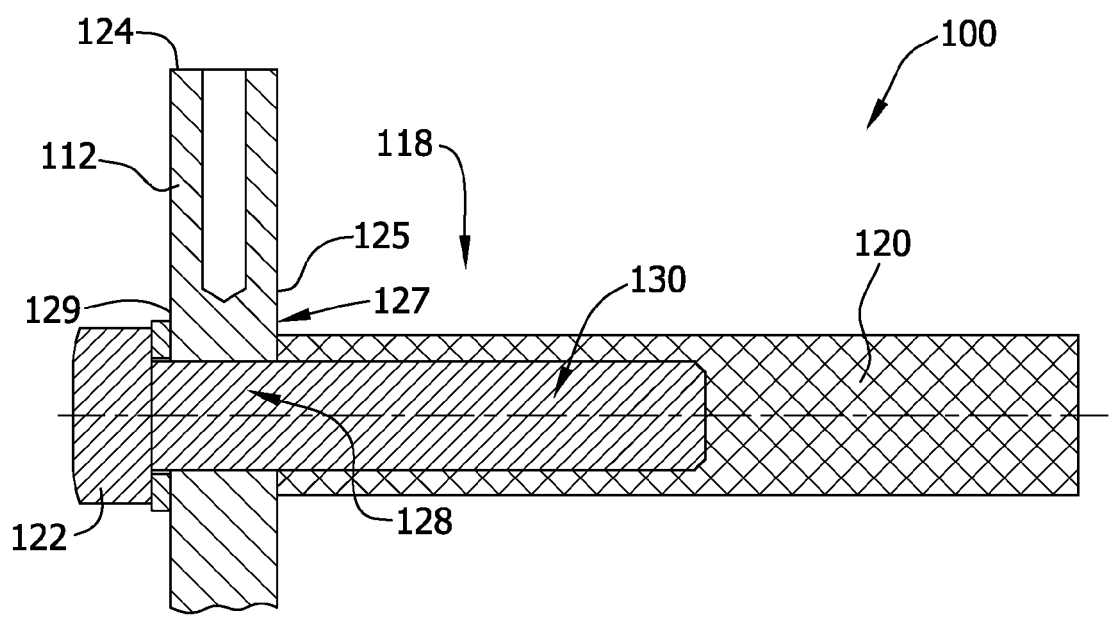

In FIGS. 2-10, the non-textured surfaces represent a first material, and the textured surfaces represent a second material that is different than the first material. Bolts shown in FIGS. 2-10 can be formed from any suitable material. FIG. 2 is a perspective view of an exemplary hub assembly 100 that may be used with wind turbine 10 (shown in FIG. 1). FIG. 3 is a side view of hub assembly 100 from the perspective of line 3-3. FIG. 4 is a cross-sectional view of hub assembly 100 taken at line 4-4. In the exemplary embodiment, hub assembly 100 is configured to couple at least one blade 20 (shown in FIG. 1) to rotor 18 (shown in FIG. 1). Hub assembly 100 includes a body 102 and a support assembly 104. Support assembly 104 is configured to carry tensile loads applied to body 102 by blades 20 and/or rotor 18.

Body 102 is formed integrally as one-piece and includes a main portion 106, a rotor coupling 108, at least one bearing seat 110, and at least one deadhead 112. As used herein, a "deadhead" is a coupling portion, attachment region, and/or any suitable portion or region that is machined to enable at least two components to be coupled together. The deadhead can correspond to a position of a riser in a mold. Further, as used herein, the term "integral" or "integrally" refers to components that are formed together as one piece by, for example, casting and/or molding. Rotor coupling 108, bearing seat 110, and deadhead 112 are formed integrally as one-piece with main portion 106 of body 102. In the exemplary embodiment, body 102 is formed from a ductile iron, a cast iron, a spherical cast iron, and/or any other suitable material.

In the exemplary embodiment, rotor coupling 108 is configured to couple hub assembly 100 to rotor 18. Body 102 includes a bearing seat 110 for each blade 20 to be coupled to hub assembly 100. Bearing seat 110 is configured to have a pitch bearing (not shown) coupled thereto. As such, blade 20 is coupled to hub assembly 100 via the pitch bearing. Alternatively, blade 20 is coupled directly to bearing seat 110. In the exemplary embodiment, bearing seat 110 includes a flange 114 that extends outwardly from main portion 106 and has a shape that corresponds to the pitch bearing. Bolt holes 116 are defined in flange 114 for coupling the pitch bearing to bearing seat 110. An area or opening 118 is defined within flange 114 of bearing seat 110. Opening 118 may be referred to as a pitch bearing opening.

Deadhead 112 is defined along flange 114 of bearing seat 110. More specifically, deadhead 112 is machined or cast within body 102 below bearing seat 110. Alternatively, deadhead 112 interrupts bearing seat 110. Deadhead 112 is configured to couple an insert 120 to body 102 using bolts 122. Although deadhead 112 is described herein as conforming with a shape of bearing seat 110, deadhead 112 can have any suitable shape that enables deadhead 112 to function as described herein, such as the shapes shown in FIGS. 5-10. In the exemplary embodiment, two deadheads 112 are defined with respect to each bearing seat 110 and are diametrically opposed to each other. Alternatively, a single deadhead 112 is defined along each bearing seat 110 and one groove (not shown) is defined in body 102 opposite to the single deadhead 112. In the exemplary embodiment, deadhead 112 includes an upper surface 124 that is substantially co-planar with an upper surface 126 of bearing seat 110. Alternatively, upper surface 124 of deadhead 112 is offset below upper surface 126 of bearing seat 110.

In the exemplary embodiment, at least an inner surface 125 of deadhead 112 is machined to define a machined surface 127. Machined surface 127 is configured to enable insert 120 to be coupled securely to deadhead 112. More specifically, machined surface 127 is machined to be smoother than other cast surfaces of body 102, or relatively smoother than the cast surfaces. As such, insert 120 contacts more of machined surface 127 as compared to a cast surface. An outer surface 129 of deadhead 112 can also be machined to enable a bolt to contact more of outer surface 129. Further, bolt holes 128 are defined through deadhead 112 by, for example, machining. Alternatively, when insert 120 is coupled to body 102 other than by bolting insert 120 to body 102, deadhead 112 does not include bolt holes 128. Although bolt holes 128 are horizontally defined in the exemplary embodiment, bolt holes 128 can be defined vertically through deadhead 112. In the exemplary embodiment, the pitch bearing extends across deadhead 112 and is coupled to body 102 at deadhead 112. Alternatively, the pitch bearing extends across deadhead 112 without being coupled to body 102 at deadhead 112 when, for example, upper surface 124 of deadhead 112 is recessed from upper surface 126 of bearing seat 110.

Support assembly 104 is positioned within opening 118 defined by bearing seat 110 and is at least partially coupled to body 102. In the exemplary embodiment, support assembly 104 includes insert 120 formed from a material that is different than the material from which body 102 is formed. More specifically, insert 120 is formed from a material having a higher yield strength than a yield strength of the material forming body 102 while having a tensile strength similar to, or higher than, a tensile strength of the body material. For example, insert 120 is formed from steel, such as S450 alloy steel plate, S275 structural steel plate, S355 structural steel plate, high strength steel, and/or any other suitable rolled steel alloy and/or steel plate having a strength higher than a strength of spherical cast iron. In a particular embodiment, insert 120 has a thickness of between about 20 mm and about 60 mm.

In the exemplary embodiment, the insert material is a rolled material and, as such, insert 120 is substantially rectangular-shaped to minimize machining of insert 120. However, insert 120 can have any suitable shape that enables insert 120 to function as described herein. In the exemplary embodiment, insert 120 includes bolt holes 130 that correspond to bolt holes 128 of deadhead 112. Alternatively, bolt holes 130 are omitted when insert 120 is coupled to body 102 other than by bolting insert 120 to body 102. The material of insert 120 has a higher yield strength than the body material to reduce a thickness of material within opening 118, as compared to known support structures. As such, the material of insert 120 is selected to reduce a weight of hub assembly 100 as compared to known hubs.

Support assembly 104 may include at least one support structure (not shown) formed integrally with body 102 from the body material. For example, a support structure extends inward from flange 114 into bearing seat area 118 and has an upper surface (not shown) that is below upper surface 126 of bearing seat 110. Two support structures can extend into each area 118 in the exemplary embodiment. The support structures are separated by an opening (not shown) defined between free edges (not shown) of each support structure. The opening is configured to receive insert 120. More specifically, insert 120 fits within the opening such that side edges 132 of insert 120 are adjacent the free edges of the support structure. As used herein, the term "adjacent" refers to at least two components and/or surfaces that are in direct contact with each other and/or positioned side-by-side in spaced relation to each other. A cutout (not shown) can be defined in each support structure to enable connections to extend from within hub assembly 100 into blade 20 and/or to reduce a weight of hub assembly 100 by removing material. In an alternative embodiment, the cutout divides each support structure into two segments that are not connected along a free edge. Alternatively, insert 120 occupies substantially all of bearing seat opening 118, and cutouts (not shown) can be defined in insert 120.

Figure 5:
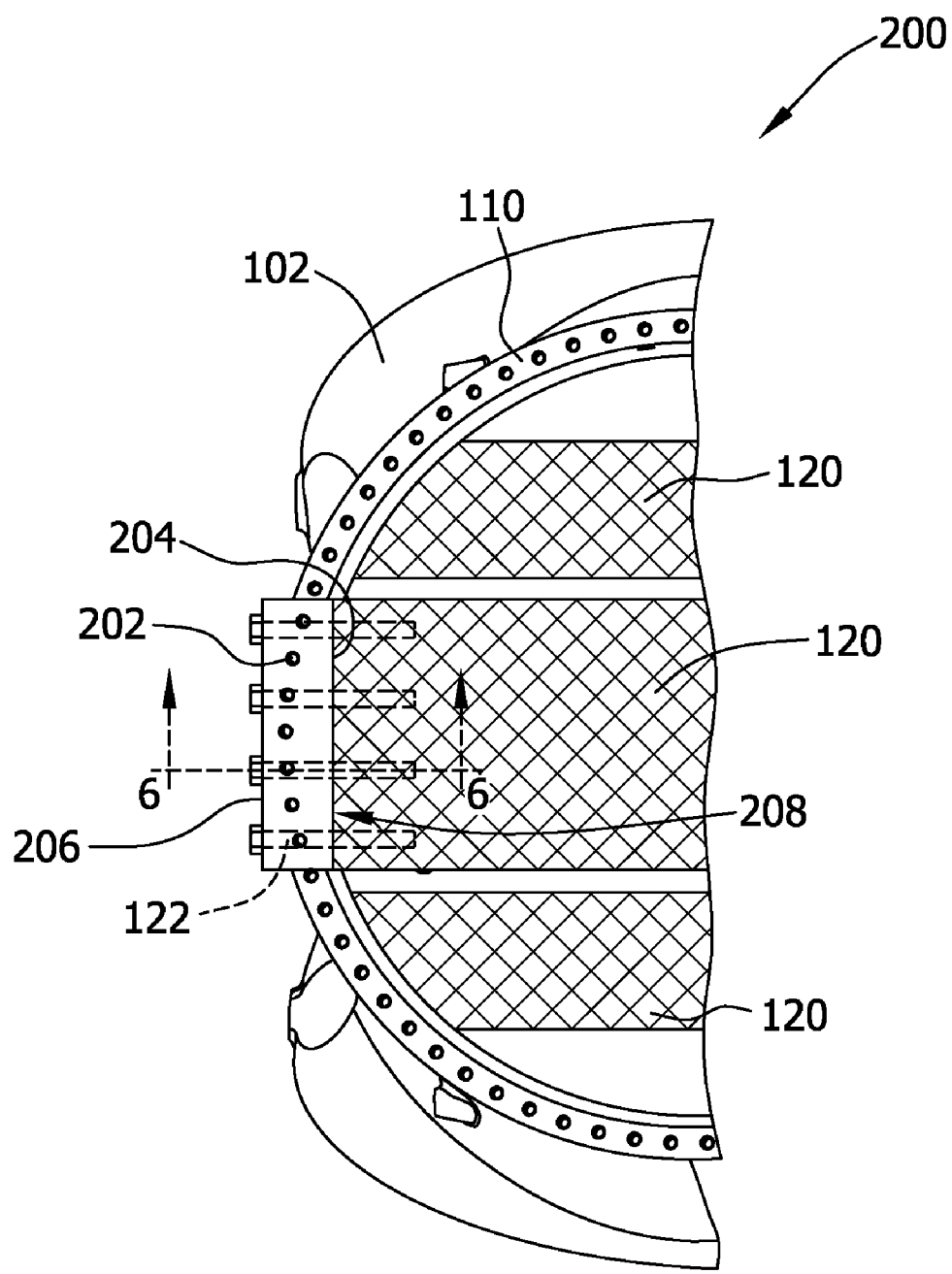
Figure 6:
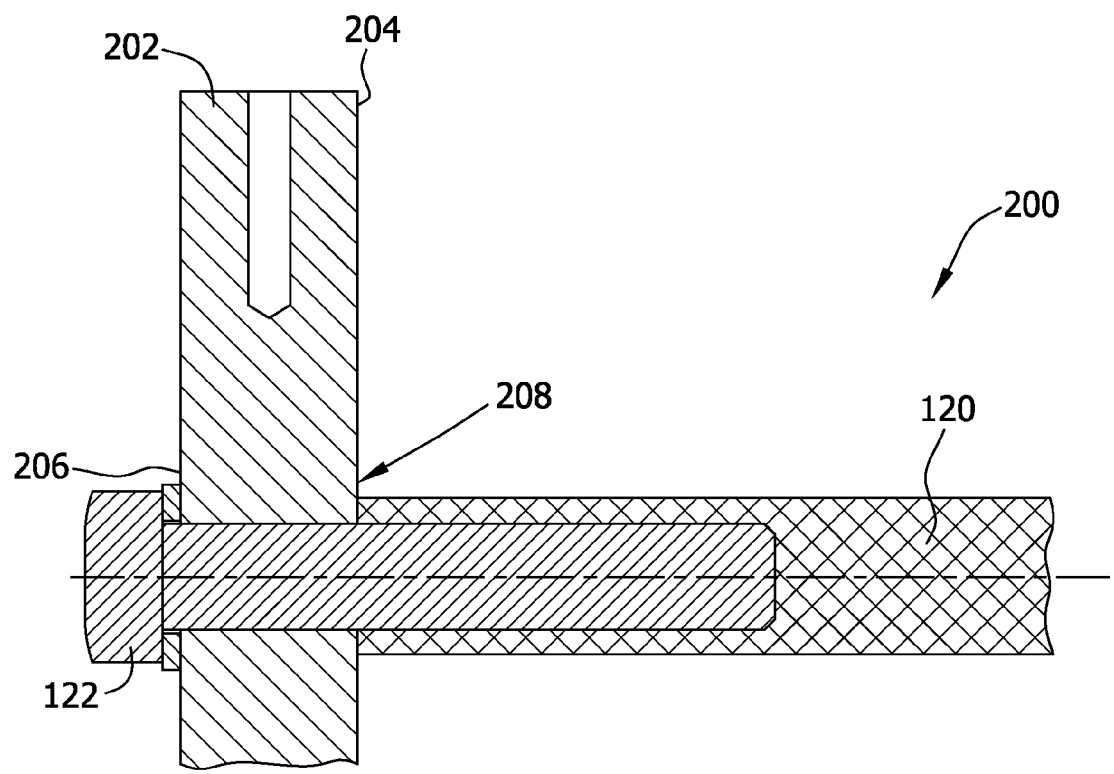

FIG. 5 is a side view of a first alternative hub assembly 200 that may be used with wind turbine 10 (shown in FIG. 1). FIG. 6 is a cross-section view of hub assembly 200. Hub assembly 200 is substantially similar to hub assembly 100 (shown in FIGS. 2-4), except aperture hub assembly 200 includes a differently configured deadhead 202. As such, components shown in FIGS. 5 and 6 are labeled with the same reference numbers used in FIGS. 2-4. Hub assembly 200 may be substituted for hub assembly 100 within wind turbine 10.

In the exemplary embodiment, deadhead 202 has a substantially rectangular shape, rather than conforming with a shape of bearing seat 110. More specifically, an inner surface 204 and an outer surface 206 of deadhead 202 are substantially planar, rather than being curved. Inner surface 204 is machined to define a relatively smooth machined surface 208 which is adjacent to insert 120 when insert 120 is coupled to deadhead 202. Outer surface 206 can also be machined to be a relatively smooth surface. Because deadhead 202 is wider than deadhead 112 (shown in FIGS. 2-4), bolts 122 extend through more of deadhead 202 than of deadhead 112 to securely couple insert 120 to deadhead 202. Further, because inner surface 204 is substantially planar, insert 120 has a planar end rather than a curved end, which reduces machining of insert 120. Similarly, because outer surface 206 is substantially planar, heads of bolts 122 can fit securely against outer surface 206.

Figure 7:
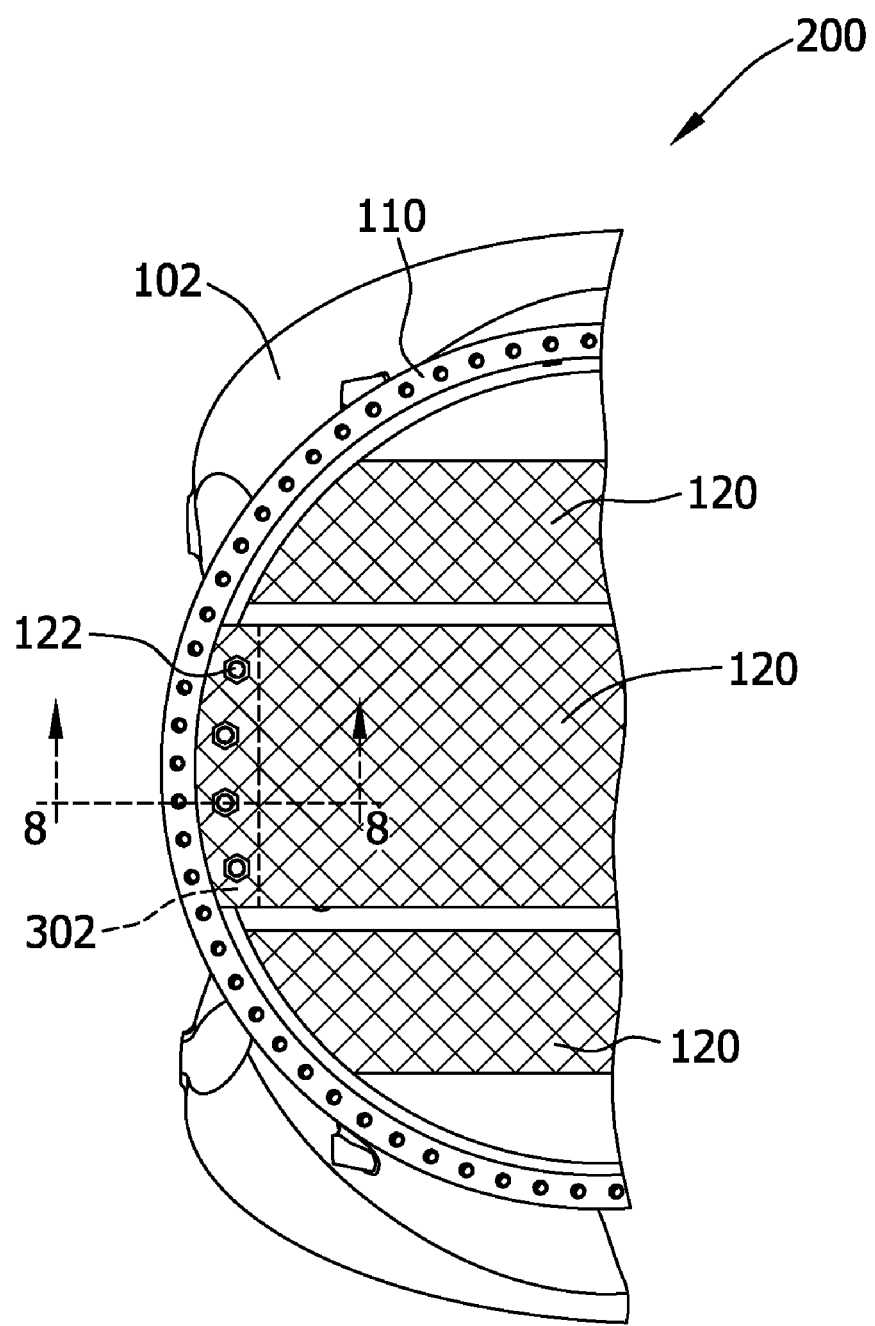
Figure 8:
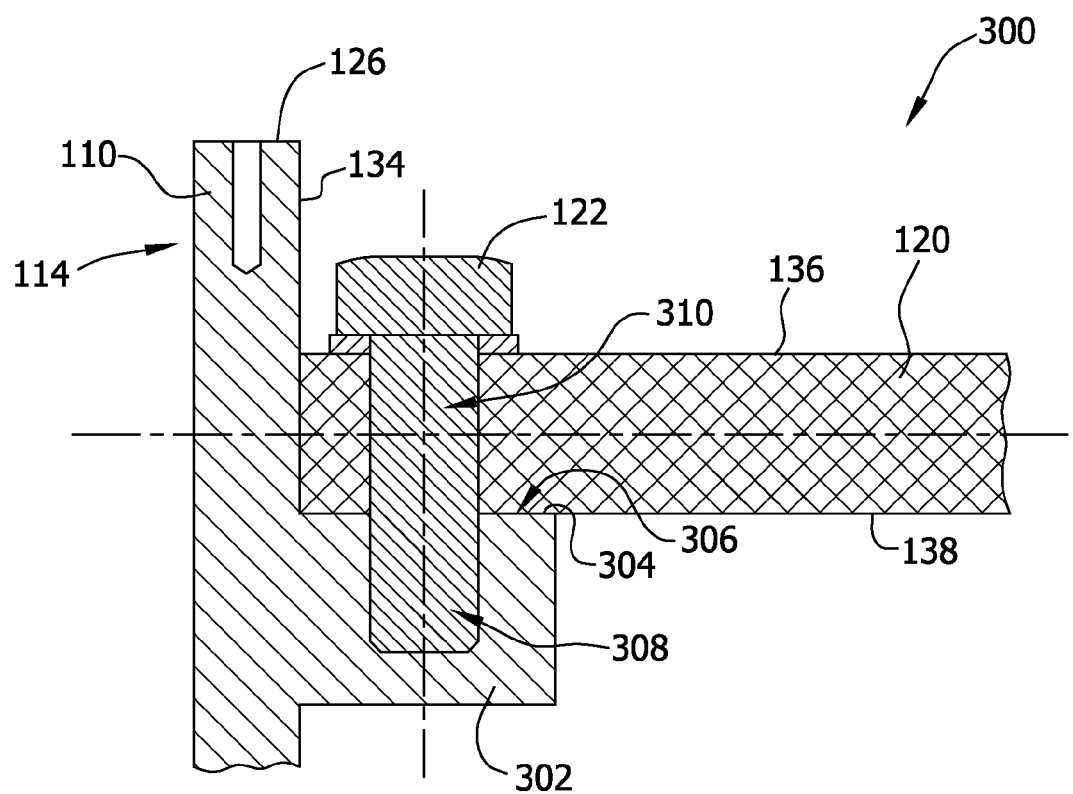

FIG. 7 is a side view of a second alternative hub assembly 300 that may be used with wind turbine 10 (shown in FIG. 1). FIG. 8 is a cross-section view of hub assembly 300. Hub assembly 300 is substantially similar to hub assembly 100 (shown in FIGS. 2-4), except aperture hub assembly 300 includes a differently configured deadhead 302. As such, components shown in FIGS. 7 and 8 are labeled with the same reference numbers used in FIGS. 2-4. Hub assembly 300 may be substituted for hub assembly 100 within wind turbine 10.

In the exemplary embodiment, deadhead 302 extends radially inwardly from bearing seat 110 and a distance below upper surface 126 of bearing seat 110. Deadhead 302 does not interrupt bearing seat 110, and the pitch bearing (not shown) is coupled to bearing seat 110 about generally the entire circumference of bearing seat 110. An upper surface 304 of deadhead 302 is substantially perpendicular to an inner surface 134 of bearing seat 110 and/or flange 114. Upper surface 304 of deadhead 302 is machined to form a relatively smooth machined surface 306. Bolt holes 308 are defined through upper surface 304 into deadhead 302. Corresponding bolt holes 310 are defined through insert 120 from an upper surface 136 of insert 120 through a lower surface 138 of insert 120. At such, bolts 122 extend through insert 120 but do not extend through deadhead 302.

Figure 9:
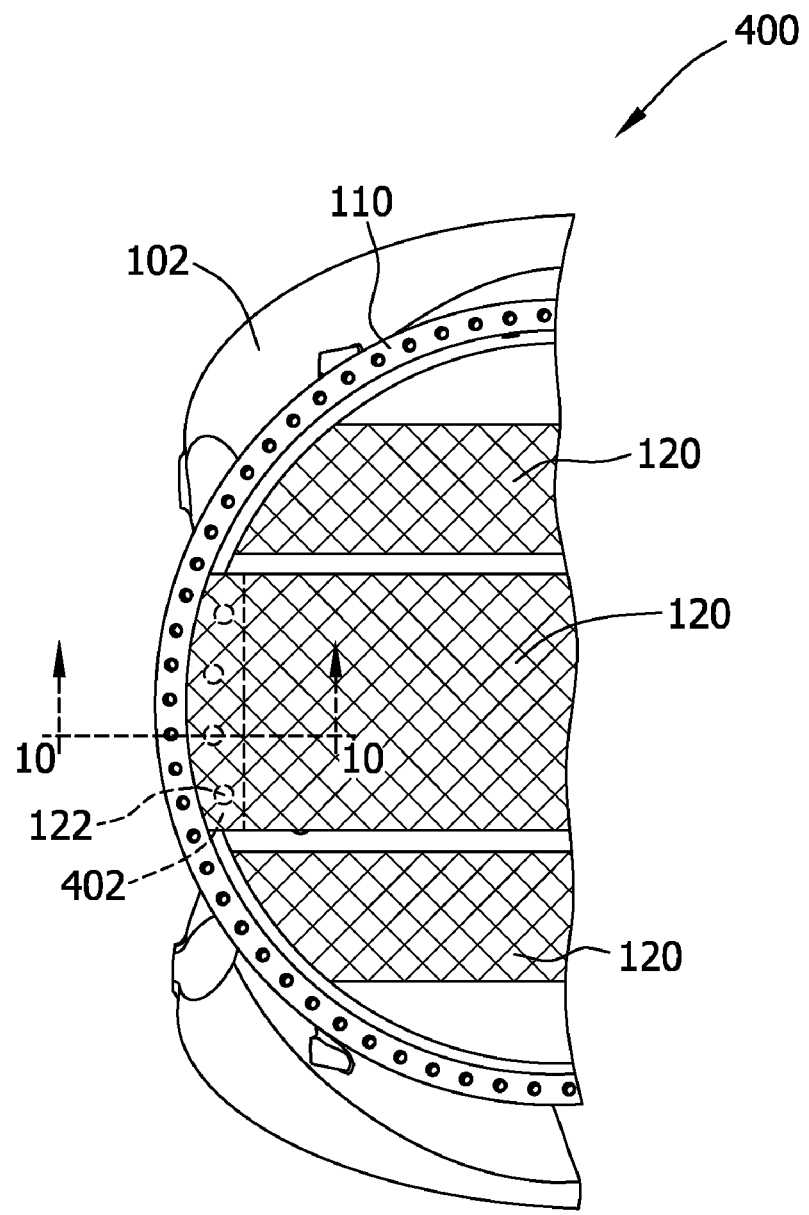
Figure 10:
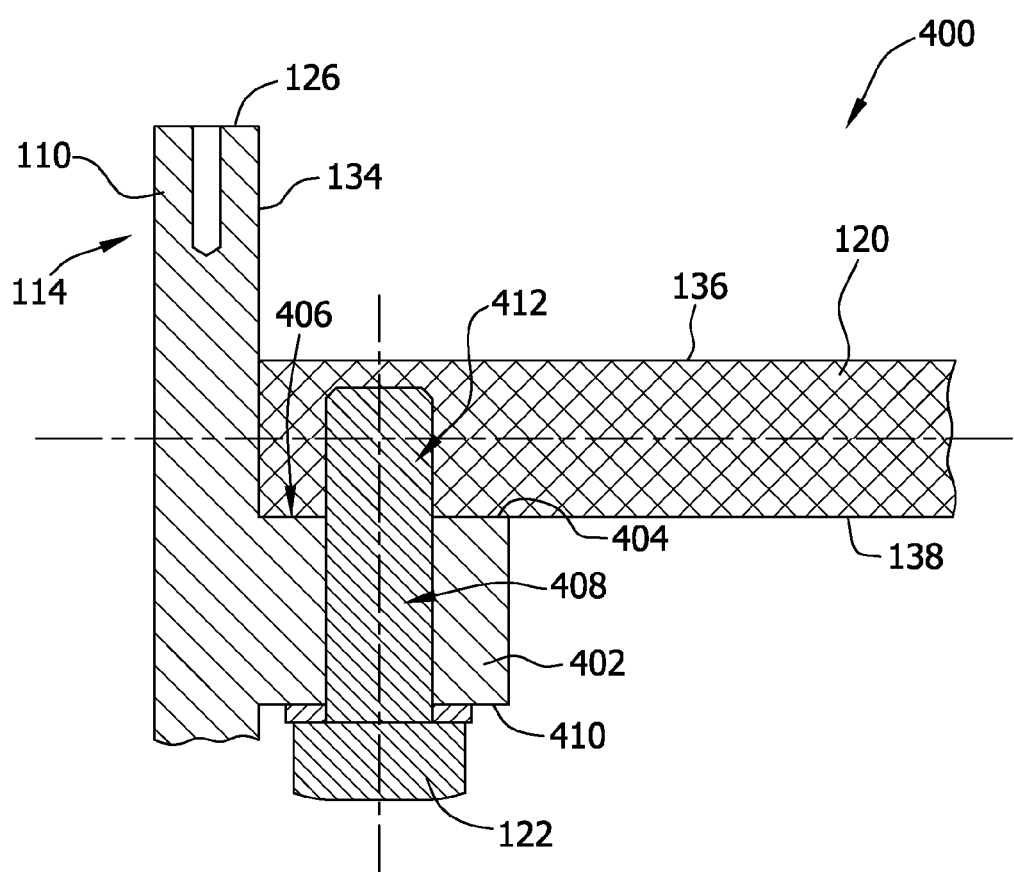

FIG. 9 is a side view of a third alternative hub assembly 400 that may be used with wind turbine 10 (shown in FIG. 1). FIG. 10 is a cross-section view of hub assembly 400. Hub assembly 400 is substantially similar to hub assembly 300 (shown in FIGS. 8 and 9), except aperture hub assembly 400 includes a differently configured deadhead 402. As such, components shown in FIGS. 9 and 10 are labeled with the same reference numbers used in FIGS. 8 and 9. Hub assembly 400 may be substituted for hub assembly 100 within wind turbine 10.

In the exemplary embodiment, deadhead 402 extends radially inwardly from bearing seat 110 and a distance below upper surface 126 of bearing seat 110. Deadhead 402 does not interrupt bearing seat 110, and the pitch bearing (not shown) is coupled to bearing seat 110 about generally the entire circumference of bearing seat 110. An upper surface 404 of deadhead 402 is substantially perpendicular to inner surface 134 of bearing seat 110 and/or flange 114. Upper surface 404 of deadhead 402 is machined to form a relatively smooth machined surface 406. Bolt holes 408 are defined through upper surface 404 and a lower surface 410 deadhead 402. Lower surface 410 of deadhead 402 can be machined to form a relatively smooth surface against which bolts 122 can be secured. Corresponding bolt holes 412 are defined into insert 120 from lower surface 138 of insert 120 toward upper surface 136 of insert 120. At such, bolts 122 extend through deadhead 402 but do not extend through insert 120.

Figure 11:
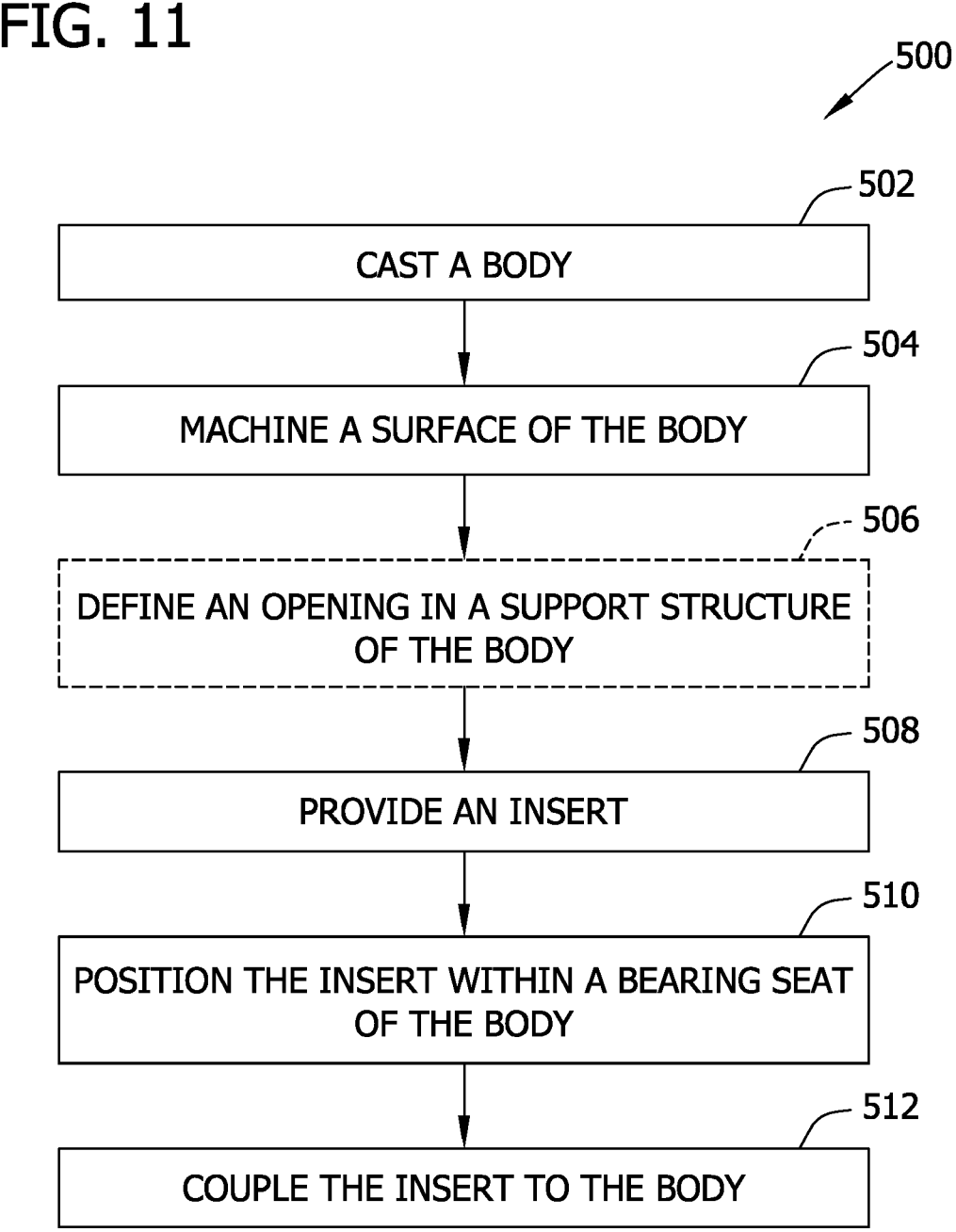

FIG. 11 is a flowchart of a method 500 for making a hub assembly. Method can be used to make any of hub assemblies 100, 200, 300, and/or 400 (shown in FIGS. 2-10); however, for clarity, method 500 will be described with respect to hub assembly 100, unless otherwise noted. Referring to FIGS. 2-4 and 11, method 500 includes casting 502 body 102, including bearing seat 110, integrally as one piece from a first material. In a particular embodiment, body 102 is cast 502 integrally as one piece from iron. Casting 502 body 102 includes casting 502 at least one deadhead 112 integrally as one piece with body 102. A support structure within opening 118 is cast 502 with body 102 in an alternative embodiment. In the exemplary embodiment, a surface of body 102 is machined 504 where insert 120 will couple to body 102. In the exemplary embodiment, at least a surface of deadhead 112 which is adjacent to insert 120 is machined 504. More specifically, inner surface 125 of deadhead 112 is machined 504 such that insert 120 can be coupled to deadhead 112 at a relatively smooth machined surface 127. When the support structure is included, an opening (not shown) is defined 506 in at least one support structure by casting and/or machining.

In the exemplary embodiment, insert 120 formed from a second material different than the first material is provided 508. As used herein, the terms "provide," "providing," and variations thereof refer to supplying, furnishing, preparing, presenting, procuring, purchasing, transferring, producing, manufacturing, fabricating, forging, machining, molding, constructing, and/or any other suitable means to provide a component. Insert 120 formed from a material having a yield strength higher than a yield strength of the first material is provided 508. In a particular embodiment, insert 120 formed from steel is provided 508.

Insert 120 is positioned 510 within opening 118 defined by bearing seat 110. When the support structures are included, insert 120 is positioned 510 in the opening defined 506 within bearing seat area 118. In the exemplary embodiment, insert 120 is coupled 512 to body 102 after being positioned 510 within opening 118. More specifically, insert 120 is coupled 512 to deadhead 112 of body 102. For example, insert 120 is coupled to deadhead 112 at machined surface 127 of deadhead 112. When insert 120 is positioned 510 and/or coupled 512, support assembly 104 is formed.

The embodiments described herein facilitate reducing a weight of a hub assembly for use with a wind turbine. More specifically, the hub assembly includes a support assembly that reduces a weight of the hub assembly, as compared to known hubs, while carrying the same or higher tensile loads as compared to known solid support structures. Because a weight of turbine-tower-top mass has a relatively large impact on turbine cost, the hub assembly described herein reduces a cost of a wind turbine, as compared to wind turbines having known hubs.

Exemplary embodiments of a hub assembly for use with a wind turbine and a method of making the same are described above in detail. The methods and apparatus are not limited to the specific embodiments described herein, but rather, components of systems and/or steps of the methods may be utilized independently and separately from other components and/or steps described herein. For example, the methods may also be used in combination with other hubs and methods, and are not limited to practice with only the hubs and methods as described herein. Rather, the exemplary embodiment can be implemented and utilized in connection with many other load-carrying applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hub assembly for use with a wind turbine, said hub assembly comprising:
    a body formed from a first material;
    a deadhead formed integrally with said body;
    a bearing seat formed integrally with said body; and
    a support assembly positioned within an opening defined by said bearing seat and at least partially coupled to said body, said support assembly comprising an insert formed from a second material different than the first material, wherein said deadhead is configured to couple said insert to said body.

2. A hub assembly in accordance with claim 1, wherein the second material comprises a material having a higher yield strength than a yield strength of the first material.

3. A hub assembly in accordance with claim 1, wherein the first material comprises iron and the second material comprises steel.

4. A hub assembly in accordance with claim 1, wherein said further comprises a machined surface configured to be adjacent a surface of said insert when said insert is coupled to said body.

5. A hub assembly in accordance with claim 1, wherein said deadhead is defined below said bearing seat and comprises horizontally oriented bolt holes.

6. A hub assembly in accordance with claim 1, wherein said deadhead extends radially inwardly from said bearing seat and comprises vertically oriented bolt holes defined in an upper surface of said deadhead.

7. A hub assembly in accordance with claim 1, wherein said deadhead extends radially inwardly from said bearing seat and comprises vertically oriented bolt holes defined in a lower surface of said deadhead.

8. A wind turbine comprising:
    a rotor;
    a blade; and
    a hub assembly configured to couple said blade to said rotor, said hub assembly comprising:
        a body formed from a first material;
        a deadhead formed integrally with said body;
        a bearing seat formed integrally with said body; and
        a support assembly positioned within an opening defined by said bearing seat and at least partially coupled to said body, said support assembly comprising an insert formed from a second material different than the first material, said insert coupled to said deadhead of said body.

9. A wind turbine in accordance with claim 8, wherein the second material comprises a material having a higher yield strength than a yield strength of the first material.

10. A wind turbine in accordance with claim 8, wherein the first material comprises iron and the second material comprises steel plate.

11. A wind turbine in accordance with claim 8, wherein said deadhead comprises a machined surface adjacent a surface of said insert.

12. A wind turbine in accordance with claim 8, wherein said deadhead is defined below said bearing seat and comprises horizontally oriented bolt holes.

13. A wind turbine in accordance with claim 8, wherein said deadhead extends radially inwardly from said bearing seat and comprises vertically oriented bolt holes.

14. A method for making a hub assembly, said method comprising:
    casting a body including a bearing seat integrally as one piece from a first material, the bearing seat defining an opening;
    casting a deadhead integrally with the body;
    positioning an insert within the opening defined by the bearing seat, the insert formed from a second material different than the first material; and
    coupling the insert to the deadhead of the body.

15. A method in accordance with claim 14, wherein casting a deadhead further comprises machining a surface of the deadhead that is configured to be adjacent the insert when the insert is coupled to the deadhead.

16. A method in accordance with claim 14, wherein casting a deadhead further comprises:
    casting a deadhead that is defined below the bearing seat; and
    forming horizontally oriented bolt holes in the deadhead.

17. A method in accordance with claim 14, wherein casting a deadhead further comprises:
    casting a deadhead that extends radially inwardly from the bearing seat; and
    forming vertically oriented bolt holes in the deadhead.

18. A method in accordance with claim 15, wherein coupling the insert to the body further comprises coupling the insert to the machined surface of the deadhead.

19. A method in accordance with claim 14, wherein positioning an insert further comprises positioning an insert formed from a material having a yield strength higher than a yield strength of the first material within the opening.

20. A method in accordance with claim 14, wherein:
    casting a body further comprises casting the body from iron; and
    positioning an insert further comprises positioning an insert formed from steel within the opening.

* * * * *